United States Patent
Yamamoto

(10) Patent No.: US 9,589,338 B2
(45) Date of Patent: Mar. 7, 2017

(54) IMAGE PROCESSING APPARATUS, IMAGE PROCESSING SYSTEM, IMAGE PROCESSING METHOD, AND NON-TRANSITORY COMPUTER READABLE MEDIUM FOR VARIED LUMINANCE ADJUSTMENT IN DIFFERENT IMAGE REGIONS

(71) Applicant: FUJI XEROX CO., LTD., Tokyo (JP)

(72) Inventor: Takayuki Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/802,636

(22) Filed: Jul. 17, 2015

(65) Prior Publication Data
US 2016/0275660 A1    Sep. 22, 2016

(30) Foreign Application Priority Data
Mar. 19, 2015   (JP) .................................. 2015-056784

(51) Int. Cl.
*G06T 5/40* (2006.01)
*G06K 9/46* (2006.01)

(52) U.S. Cl.
CPC .............. *G06T 5/40* (2013.01); *G06K 9/4609* (2013.01); *G06K 9/4642* (2013.01); *G06K 9/4652* (2013.01); *G06K 9/4661* (2013.01)

(58) Field of Classification Search
None
See application file for complete search history.

(56) References Cited

U.S. PATENT DOCUMENTS 6,754,399 B2 *   6/2004   Pettigrew ............. H04N 1/6011
                                            382/218
2005/0152613 A1  7/2005   Okutsu et al.
2007/0171440 A1  7/2007   Yoshida

FOREIGN PATENT DOCUMENTS

JP   2005-202469 A   7/2005
JP   2006-074162 A   3/2006
(Continued)

OTHER PUBLICATIONS

"Chromaticity versus Chrominance." Colormancer. Colormancer, Nov. 15, 2011. Web. Aug. 3, 2016.*
(Continued)

*Primary Examiner* — Chan Park
*Assistant Examiner* — Geoffrey E Summers
(74) *Attorney, Agent, or Firm* — Oliff PLC

(57) ABSTRACT

An image processing apparatus includes a component acquisition unit that acquires a chromaticity component and a luminance component from each of a process target image and a reference image, a feature quantity extraction unit that extracts a feature quantity from the chromaticity component and the luminance component of each of the process target image and the reference image, a chromaticity component adjustment unit that matches the chromaticity component of the process target image to the chromaticity component of the reference image using the feature quantity of the chromaticity component, and a luminance component adjustment unit that matches the luminance component of the process target image to the luminance component of the reference image in a non-dark region other than a dark region, and reduces an amount of adjustment in the adjustment of the dark region to be smaller than an amount of adjustment applied to the non-dark region.

15 Claims, 7 Drawing Sheets

(56) References Cited

FOREIGN PATENT DOCUMENTS

| JP | 4568692 B2 | 10/2010 |
| JP | 2013-167999 A | 8/2013 |
| JP | 2014-130442 A | 7/2014 |

OTHER PUBLICATIONS

Feb. 2, 2016 Office Action issued in Japanese Patent Application No. 2015-056784.

* cited by examiner

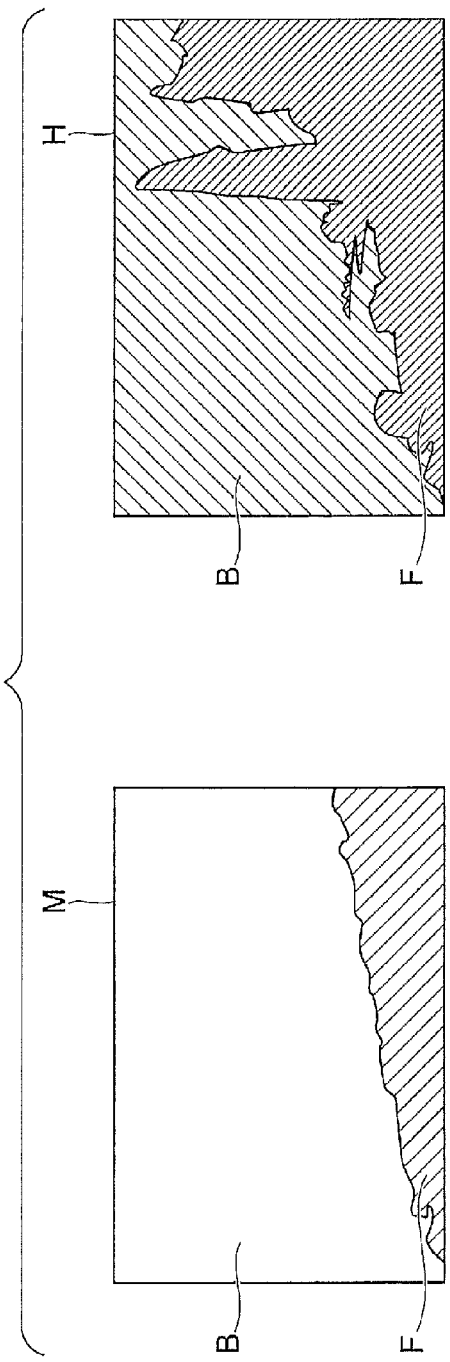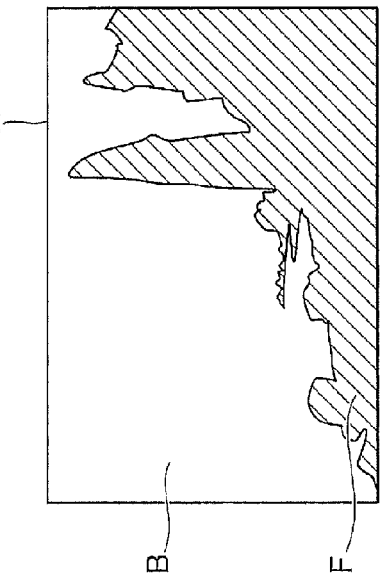

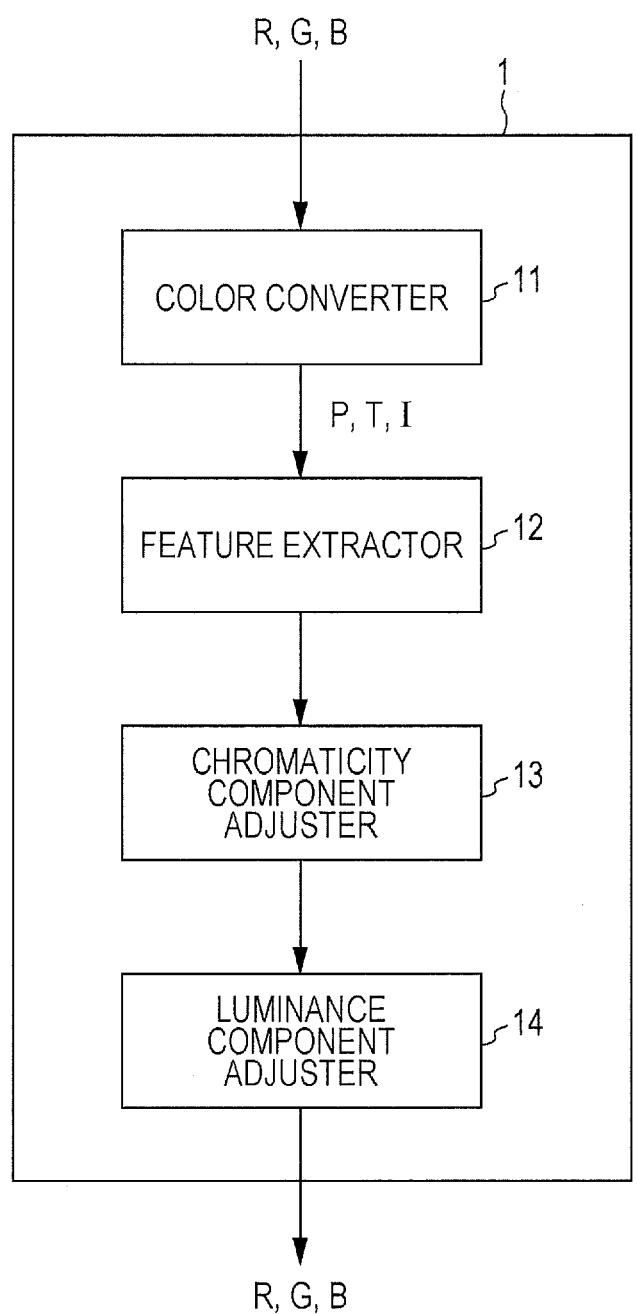

IMAGE PROCESSING APPARATUS, IMAGE PROCESSING SYSTEM, IMAGE PROCESSING METHOD, AND NON-TRANSITORY COMPUTER READABLE MEDIUM FOR VARIED LUMINANCE ADJUSTMENT IN DIFFERENT IMAGE REGIONS

CROSS-REFERENCE TO RELATED APPLICATIONS

This application is based on and claims priority under 35 USC 119 from Japanese Patent Application No. 2015-056784 filed Mar. 19, 2015.

BACKGROUND (i) Technical Field

The present invention relates to an image processing apparatus, an image processing system, an image processing method, and a non-transitory computer readable medium.

(ii) Related Art

More and more users photograph and view digital images as digital cameras are in widespread use. Image editing software of a personal computer (PC) has been used to adjust image quality to result in a desired image. As smart phones and tablets become widely used, there is a growing demand for image quality adjustment to be performed more intuitively.

In the image quality adjustment of a digital image, component values of chromaticity, luminance, hue, and chroma, and contrast thereof are adjusted in color spaces such as the red, green, and blue (RGB) space, the CIEL*a*b* space, or the hue, saturation, and value (HSV) space. In the adjustment, a user specifies a reference image serving as a sample, and then performs an image processing process to match an image quality of a process target image to an image quality of the reference image.

SUMMARY

According to an aspect of the invention, there is provided an image processing apparatus. The image processing apparatus includes a component acquisition unit that acquires a chromaticity component and a luminance component from each of a process target image and a reference image, the process target image to be image-processed to cause an impression of the process target image to match the reference image, a feature quantity extraction unit that extracts a feature quantity from the chromaticity component and the luminance component of each of the process target image and the reference image, a chromaticity component adjustment unit that adjusts the process target image to match the chromaticity component of the process target image to the chromaticity component of the reference image using the feature quantity of the chromaticity component, and a luminance component adjustment unit that adjusts the process target image to match the luminance component of the process target image to the luminance component of the reference image in a non-dark region other than a dark region using the feature quantity of the luminance component, and reduces an amount of adjustment in the adjustment of the dark region of the process target image to be smaller than an amount of adjustment applied to the non-dark region.

BRIEF DESCRIPTION OF THE DRAWINGS

Exemplary embodiments of the present invention will be described in detail based on the following figures, wherein:

FIG. 1A through FIG. 1C illustrate an image processing process to match an image quality of a process target image to an image quality of a reference image;

FIG. 2 is a block diagram illustrating the functional configuration of an image processing apparatus of an exemplary embodiment;

DETAILED DESCRIPTION

Figure 3A:
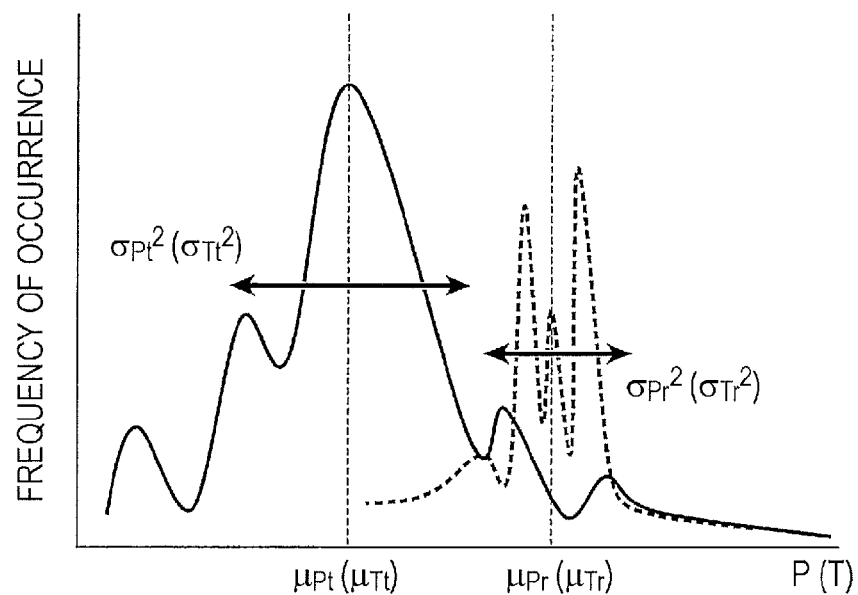
FIG. 3A illustrates the concept of a histogram of the process target image and the reference image before the image processing process.

Exemplary embodiments of the present invention are described with reference to the drawings.

FIG. 1A through FIG. 1C illustrate an image processing process to match an image quality of a process target image to an image quality of a reference image.

FIG. 1A illustrates the reference image and the process target image before the image processing process.

The left-hand side of the FIG. 1A is a reference image M, and the right-hand side of FIG. 1A is a process target image H. In the context of this specification, the process target image is used to refer to an image serving as a target of the image processing process, and the reference image represents an image giving an impression desired by a user and serving as a reference in the image processing process of the process target image.

The reference image M and the process target image H are displayed on a display apparatus, such as a liquid-crystal panel or a liquid-crystal display. Image editing software running on a tablet, a smart phone, a personal computer (PC) or the like performs the image processing process on image information. With the image editing software operating, the user performs the image processing process by operating a menu and the like displayed together with the reference image M and the process target image H on the display apparatus. In the case of a tablet or a smart phone, the user may perform the image processing process by touching the liquid-crystal panel with his or her finger or touchpen. In the case of the PC, the user performs the image processing process using a keyboard or a mouse, connected to the PC. In the exemplary embodiment, a function performing the image processing process in the tablet or smart phone, and the PC may be considered as an example of an image processing apparatus that performs the image processing process on the image information displayed on the display apparatus. The image processing apparatus and the display apparatus may be considered as an example of an image processing system.

Each of the reference image M and process target image H displayed includes a foreground F as an image of the ground and a background B as an image of the sky. In each of the reference image M and process target image H, the foreground F is a dark region where lightness is lower, and the background B is a non-dark region where lightness is higher.

The user may now perform the image processing process on the process target image H in order to make the process target image H look like an image that gives an impression similar to the background B of the reference image M. For example, the background B of the process target image H may be a red sky image, and the background B of the process target image H is a blue sky image. The background B of the process target image H may now be changed to be a red sky image.

FIG. 1B illustrates the process target image H after an image processing process of related art has been performed.

In the image processing process, the entire process target image H is a process target. The image processing process is thus performed not only on the background B as the sky image but also on the foreground F as the ground image. As a result, the foreground F as a dark region has excessively high luminance, tending to become an unnaturally looking image. Such image processing is typical in the specifications available from the image editing software of related art. For example, Adobe Photoshop manufactured by Adobe Systems Incorporated performs similar image processing.

In accordance with the exemplary embodiment, the image processing process is performed to control a variation in the pixel value such that an image in the dark region after the image processing process looks natural.

FIG. 1C illustrates the process target image H on which the image processing process controlling the variation in the pixel value has been performed on the dark region.

In this case as well, the entire process target image H is a target of the image processing process in a similar way as illustrated in FIG. 1B. In the dark region, however, the image processing process controlling the variation in the pixel value is performed, and the lightness of the foreground F of the ground is controlled to be lower. In the non-dark region, on the other hand, the image processing process similar to the image processing process applied to the image of FIG. 1B is performed. In this way, the image of FIG. 1C looks more natural than the image of FIG. 1B.

The image processing apparatus achieving this result is described below.

First Exemplary Embodiment

A first exemplary embodiment of the present invention is described below.

FIG. 2 is a block diagram illustrating the functional configuration of an image processing apparatus 1 of the first exemplary embodiment.

As illustrated in FIG. 2, the image processing apparatus 1 includes a color converter 11, a feature extractor 12, a chromaticity component adjuster 13, and a luminance component adjuster 14. The color converter 11 acquires image information of a process target image and reference image (input image data), and converts the image data into a chromaticity component and a luminance component. The feature extractor 12 extracts a feature quantity from the converted image information. The chromaticity component adjuster 13 matches a feature quantity of the process target image to a feature quantity of the reference image in the chromaticity component. The luminance component adjuster 14 matches a feature quantity of the process target image to a feature quantity of the reference image in the luminance component.

The color converter 11 performs color conversion on the input image data to display the process target image and the reference image on the display apparatus. The input image data is video data (namely, red, green, and blue (RGB) data).

The color converter 11 then converts the RGB data into IPT data. In other words, chromaticity in the RGB color space is converted into chromaticity in the IPT color space. The IPT color space is a rectangular coordinate system color space composed of three components of lightness (I), chromaticity (P) in a red-green direction, and chromaticity (T) in a yellow-blue direction. In the exemplary embodiment, chromaticity (P) in the red-green direction, and chromaticity (T) in the yellow-blue direction are chromaticity components, and lightness (I) is a luminance component. The color converter 11 is considered as an example of a component acquisition unit that acquires the chromaticity components (P and T), and the luminance component (I).

The feature extractor 12 extracts the feature quantities of the chromaticity component and luminance component from the process target image and the reference image. The feature quantity is an index that determines the impression of the image when the user views the image. In accordance with the exemplary embodiment, the feature quantities are the mean value and dispersion of the pixel values of the pixels forming the process target image and the reference image. The pixel value is composed of the chromaticity components (P and T), and the luminance component (I). The feature quantity is extracted from each of the chromaticity components (P and T), and the luminance component (I). In accordance with the exemplary embodiment, an arithmetic mean is used as the mean value, and a standard deviation is used as the dispersion.

More specifically, the feature extractor 12 calculates the arithmetic means of the chromaticity components (P and T) and the luminance component (I) of the pixels forming the process target image and the reference image. The feature extractor 12 also calculates the standard deviations of the chromaticity components (P and T) and the luminance component (I) of the pixels forming the process target image and the reference image.

The six arithmetic mean values result because the arithmetic mean is determined on each of the chromaticity components (P and T) and the luminance component (I) of each of the process target image and the reference image. The six arithmetic mean values are calculated in accordance with formulas (1).

In formulas (1), $P_{i,j}$ represents a P value at the position (i,j) of each pixel forming the process target image and the reference image. $T_{i,j}$ represents a T value at the position (i,j) of each pixel forming the process target image and the reference image. $I_{i,j}$ represents an I value at the position (i,j) of each pixel forming the process target image and the reference image.

In formulas 1, $\mu_{Pt}$ represents the arithmetic mean value of P values of the process target image, $\mu_{Tt}$ represents the arithmetic mean value of T values of the process target image, and $\mu_{It}$ represents the arithmetic mean value of I values of the process target image.

$\mu_{Pr}$ represents the arithmetic mean value of P values of the reference image, $\mu_{Tr}$ represents the arithmetic mean value of T values of the reference image, and $\mu_{Ir}$ represents the arithmetic mean value of I values of the reference image.

$$\mu_{Pt} = \frac{1}{ij}\sum(P_{i,j}), \mu_{Tt} = \frac{1}{ij}\sum(T_{i,j}), \mu_{It} = \frac{1}{ij}\sum(I_{i,j}) \quad (1)$$

$$\mu_{Pr} = \frac{1}{ij}\sum(P_{i,j}), \mu_{Tr} = \frac{1}{ij}\sum(T_{i,j}), \mu_{Ir} = \frac{1}{ij}\sum(I_{i,j})$$

The six standard deviations result because one standard deviation is determined on each of the chromaticity components (P and T) and the luminance component (I) on each of the process target image and the reference image. The standard deviations are calculated in accordance with the formulas (2).

In formulas (2), $P_{i,j}$, $T_{i,j}$, and $I_{i,j}$ are identical to those in formulas (1).

In formulas (2), $\sigma_{Pt}$ represents the standard deviation of the P values of the process target image, $\sigma_{Tt}$ represents the standard deviation of the T values of the process target image, and $\alpha_{It}$ represents the standard deviation of the I values of the process target image.

Furthermore, $\sigma_{Pr}$ represents the standard deviation of the P values of the reference image, $\sigma_{Tr}$ represents the standard deviation of the T values of the reference image, and $\sigma_{Ir}$ represents the standard deviation of the I values of the reference image.

$$\sigma_{Pt} = \sqrt{\frac{1}{ij}\sum(P_{i,j} - \mu_{Pt})^2}, \sigma_{Tt} = \sqrt{\frac{1}{ij}\sum(T_{i,j} - \mu_{Tt})^2}, \quad (2)$$

$$\sigma_{It} = \sqrt{\frac{1}{ij}\sum(I_{i,j} - \mu_{It})^2}$$

$$\sigma_{Pr} = \sqrt{\frac{1}{ij}\sum(P_{i,j} - \mu_{Pr})^2}, \sigma_{Tr} = \sqrt{\frac{1}{ij}\sum(T_{i,j} - \mu_{Tr})^2},$$

$$\sigma_{Ir} = \sqrt{\frac{1}{ij}\sum(I_{i,j} - \mu_{Ir})^2}$$

The chromaticity component adjuster 13 adjusts the process target image to match the chromaticity component of the process target image to the chromaticity component of the reference image using the feature quantity of the chromaticity component.

In this process, the chromaticity component adjuster 13 sets the arithmetic mean value and standard deviation of the pixels of the process target image to be closer to the arithmetic mean value and the standard deviation of the reference image, using the arithmetic mean value and standard deviation of the chromaticity components of the process target image and reference image.

This process may be performed in accordance with formula (3) and formula (4). Formula (3) is used t calculate the P values. In formula (3), $P_{i,j}$ represents a P value at a position (i,j) of each of the pixels forming the process target image prior to the adjustment. $P'_{i,j}$ represents a P value at a position (i,j) of each of the pixels forming the process target image subsequent to the adjustment.

Formula (4) is used to calculate a T value. In formula (4), $T_{i,j}$ represents a T value at a position (i,j) of each of the pixels forming the process target image prior to the adjustment. $T'_{i,j}$ represents a T value at a position (i,j) of each of the pixels forming the process target image subsequent to the adjustment.

The chromaticity components (P,T) at a pixel at a position (i,j) forming the process target image are thus adjusted to match to the reference image.

$$P'_{i,j} = (P_{i,j} - \mu_{Pr})\frac{\sigma_{Pr}}{\sigma_{Pt}} + \mu_{Pr} \quad (3)$$

$$T'_{i,j} = (T_{i,j} - \mu_{Tt})\frac{\sigma_{Tr}}{\sigma_{Tt}} + \mu_{Tr} \quad (4)$$

FIG. 3A illustrates the concept of histograms of the process target image and reference image prior to the image processing process.

As illustrated in FIG. 3A, the abscissa represents chromaticity component, thus, a P value or a T value. The ordinate represents frequency of occurrence (the number of pixels). The solid graph is the histogram of the process target image, and the broken graph is the histogram of the reference image. Since the histograms are prior to the image processing process, the arithmetic mean value $\mu_{Pt}$ (or $\mu_{Tt}$) of the process target image is different from the arithmetic mean value $\mu_{Pr}$ (or $\mu_{Tr}$) of the reference image. The standard deviation $\sigma_{Pt}$ (or $\sigma_{Tt}$) of the process target image is different from the standard deviation $\sigma_{Pr}$ (or $\sigma_{Tr}$) of the reference image.

Figure 3B:
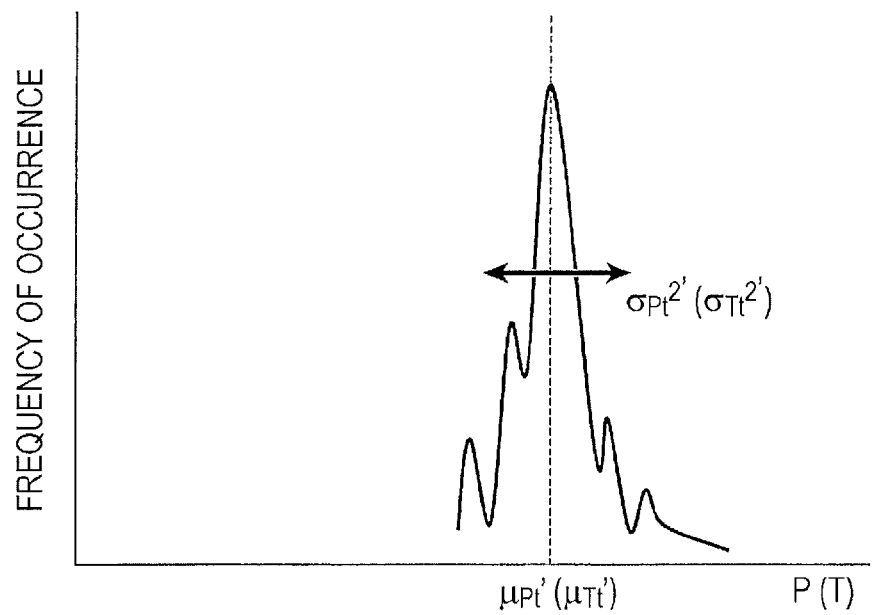
FIG. 3B illustrates the concept of a histogram of the process target image after a chromaticity component adjuster adjusts a chromaticity component.

FIG. 3B illustrates the concept of histograms of the process target image after the chromaticity component is adjusted by the chromaticity component adjuster 13.

Referring to FIG. 3B, the abscissa represents chromaticity component, and a P value or a T value. The ordinate represents frequency of occurrence (the number of pixels). After the chromaticity component is adjusted by the chromaticity component adjuster 13, the arithmetic mean value of the process target image matches the arithmetic mean value of the reference image. Also, the standard deviation of the process target image matches the standard deviation of the reference image.

The luminance component adjuster 14 adjusts the process target image to match the luminance component of the process target image to the luminance component of the reference image using the feature quantity of the luminance component.

This process is performed in accordance with formula (5). In formula (5), $I_{i,j}$ represents an I value at a position (i,j) forming the process target image prior to the adjustment, and $I'_{i,j}$ represents an I value at a position (i,j) forming the process target image subsequent to the adjustment.

In the exemplary embodiment, the luminance component adjuster 14 sets an amount of adjustment in the dark region to be smaller than an amount of adjustment applied to a region other than the dark region (non-dark region). The dark region falls within 10 percent of the entire luminance range (0 to 1) of the IPT color space ($0 \le I_{i,j} \le 0.1$).

This process is performed in accordance with formula (6), for example. A quadratic function that monotonously increases is used in the adjustment of the dark region. Let x represents a threshold value serving a border between the dark region and the non-dark region, and x is 0.1 in the above example.

$$I'_{i,j} = (I_{i,j} - \mu_{It})\frac{\sigma_{Ir}}{\sigma_{It}} + \mu_{Ir} \quad (I_{i,j} > x) \quad (5)$$

$$I'_{i,j} = -\left\{\left(I_{i,j} - \left(x + \frac{a}{2}\right)\right)^2 + 4ax + a^2 + 4b\mu_{Ir}\right\} \quad (6)$$

$$(I_{i,j} \le x)$$

$$(a = \sigma_{Ir}^2/\sigma_{It}^2, b = \mu_{Ir} - a\mu_{It})$$

Figure 4:
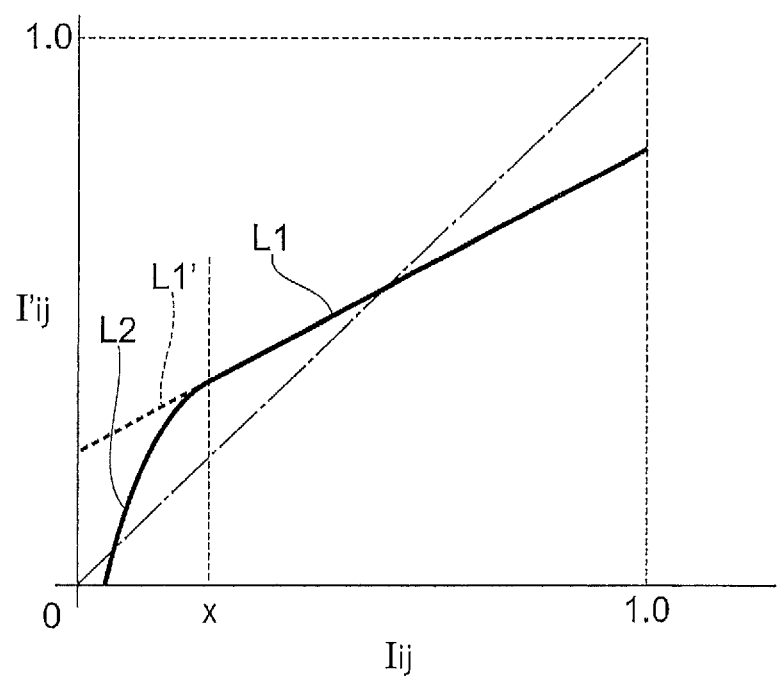
FIG. 4 illustrates in an adjustment tone curve a luminance adjustment performed by a luminance component adjuster.

FIG. 4 illustrates in an adjustment tone curve a luminance adjustment performed by the luminance component adjuster 14. The abscissa represents I value ($I_{i,j}$) prior to the adjustment, and the ordinate represents I value ($I'_{i,j}$) subsequent to the adjustment.

If the I value ($I_{i,j}$) is higher than the threshold value x, the luminance component adjustment is performed in accordance with formula (5). If the I value ($I_{i,j}$) is equal to or below the threshold value x, the luminance component adjustment is performed in accordance with formula (6). If the I value ($I_{i,j}$) is higher than the threshold value x, the adjustment tone curve becomes linear as represented by L1. In contrast, if the I value ($I_{i,j}$) is equal to or below the threshold value x, the adjustment tone curve becomes L2 calculated in accordance with formula (6), rather than L1' calculated in accordance with formula (5). The amount of adjustment is a difference in the ordinate between the adjustment tone curve represented by the solid line and the adjustment tone curve represented by the broken line. If L1' and L2 are compared with each other in the dark region, L2 is closer to a dot-dash line than L1' is. The amount of adjustment of L2 is thus smaller. More specifically, in the adjustment tone curve, the amount of adjustment in the dark region is smaller than the amount of adjustment to be applied to the non-dark region.

$P'_{i,j}$, $T'_{i,j}$, and $I'_{i,j}$ are thus the image data of the process target image subsequent to the image processing process. The image data matches to the reference image in the non-dark region in impression. In the dark region, the image processing process is performed to control the variations in the pixel values to cause the image in the dark region to look natural.

$P'_{i,j}$, $T'_{i,j}$, and $I'_{i,j}$ as the image data subsequent to the image processing process are re-converted into the format of the input image data acquired by the color converter 11, and then output to the display apparatus. More specifically, the IPT data is converted back into the RGB data. The display apparatus then displays the image-processed process target image.

Second Exemplary Embodiment

A second exemplary embodiment is described.

In the first exemplary embodiment, the threshold value x is a fixed value, and the I value handled as the dark region falls within a predetermined range. The present invention is not limited to this method. In the second exemplary embodiment, the threshold value x is set to be variable in the process target image.

The function and configuration of the image processing apparatus 1 of the second exemplary embodiment remain unchanged from those illustrated in FIG. 2. The functions of the color converter 11, the feature extractor 12, and the chromaticity component adjuster 13 remain unchanged from those of the counterparts in the first exemplary embodiment. The luminance component adjuster 14 is described as a difference from the first exemplary embodiment.

If the pixels of the process target image are arranged in the ascending order of luminance values based on the luminance component, the luminance component adjuster 14 sets to be in the dark region a pixel that falls within a predetermined percentage from a minimum luminance value. The ratio is 10 percent, for example.

Figure 5:
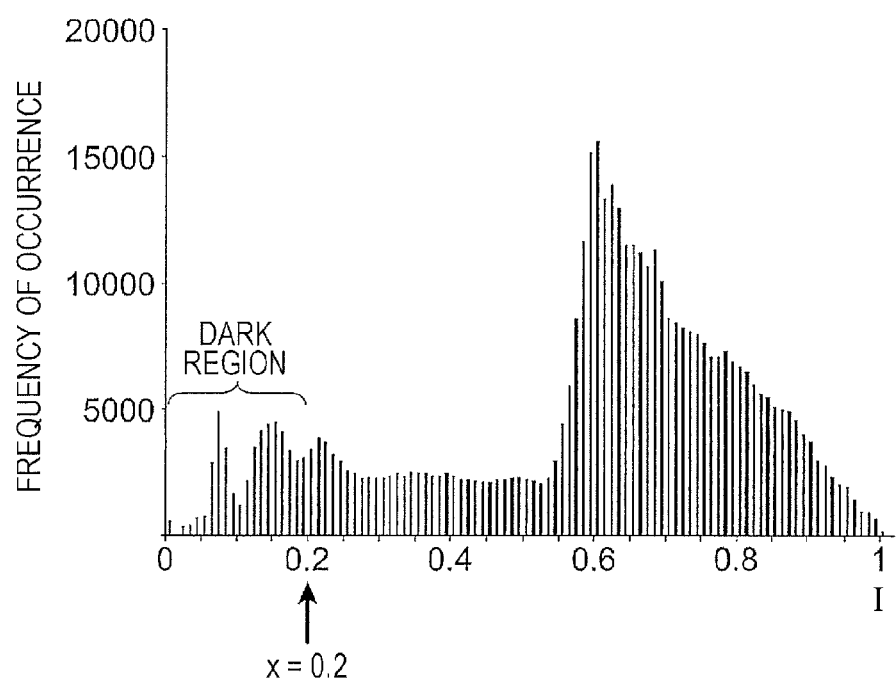
FIG. 5 illustrates a determination method of a dark region in a second exemplary embodiment.

FIG. 5 illustrates a determination method of the dark region in the second exemplary embodiment.

FIG. 5 illustrates a luminance histogram of the process target image. The abscissa represents luminance component and the ordinate represents frequency of occurrence (the number of pixels).

The pixels falling within 10 percent from a minimum luminance (darker side) as a ratio to the entire range are set to be the dark region. In this case, the threshold value x is 0.2.

As described above, the luminance component adjuster 14 performs the luminance adjustment of the process target image in accordance with formulas (5) and (6).

Third Exemplary Embodiment

A third exemplary embodiment is described below.

The functions of the elements of the image processing apparatus 1 of the third exemplary embodiment are identical to those of the first exemplary embodiment except the luminance component adjuster 14. The luminance component adjuster 14 is thus described as a difference from the first embodiment.

The luminance component adjuster 14 of the third exemplary embodiment determines the dark region by comparing the luminance of each pixel of the process target image with the luminance of each pixel of the reference image.

Figure 6:
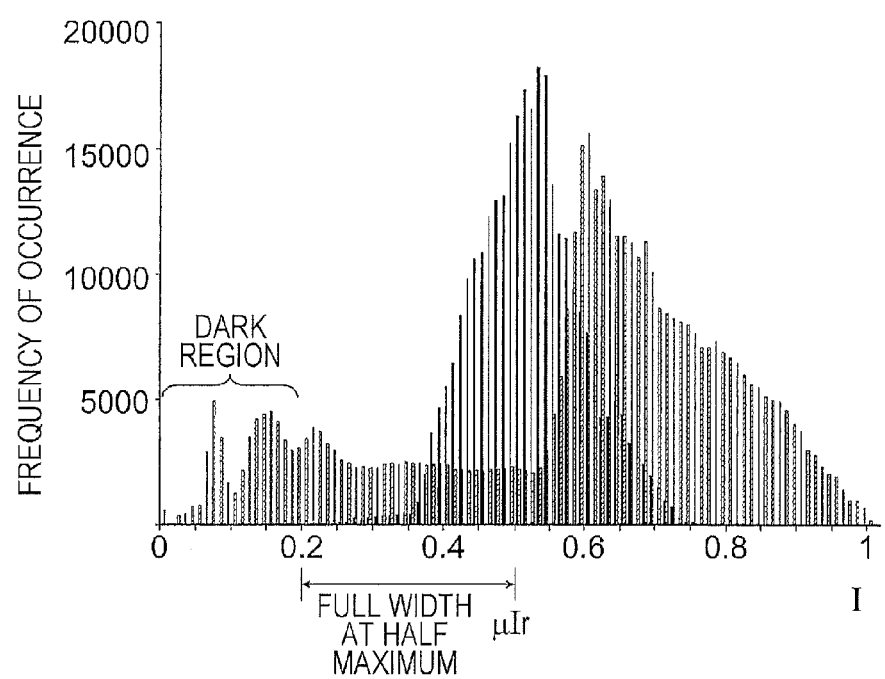
FIG. 6 illustrates a determination method of the dark region in a third exemplary embodiment.

FIG. 6 illustrates a determination method of the dark region in the third exemplary embodiment.

FIG. 6 illustrates the luminance histogram of the process target image overlaid on the luminance histogram of the reference image. The abscissa represents luminance component and the ordinate represents frequency of occurrence (the number of pixels).

In the third exemplary embodiment, the threshold value x results from subtracting a full width at half maximum of the luminance histogram of the reference image from the arithmetic mean $\mu_{I_r}$ of luminance in the luminance histogram of the reference image. If the arithmetic mean $\mu_{I_r}$ is 0.5, and the full width at half maximum is 0.3, x=0.5−0.3=02. The pixels having an I value ($I_{i,j}$) of the process target image is 0.2 or below are set to be a dark region.

The dark region of the process target image is determined by directly comparing the histograms of the process target image and the reference image. The present invention is not limited to this method.

For example, the histograms of the process target image and the reference image may be approximated using a statistical probability distribution, such as Gaussian mixture model, and resulting sets of Gaussian distributions may be compared. For example, expectation-maximization (EM) algorithm may be used to approximate the histograms of the process target image and the reference image by the Gaussian mixture model.

Figure 7:
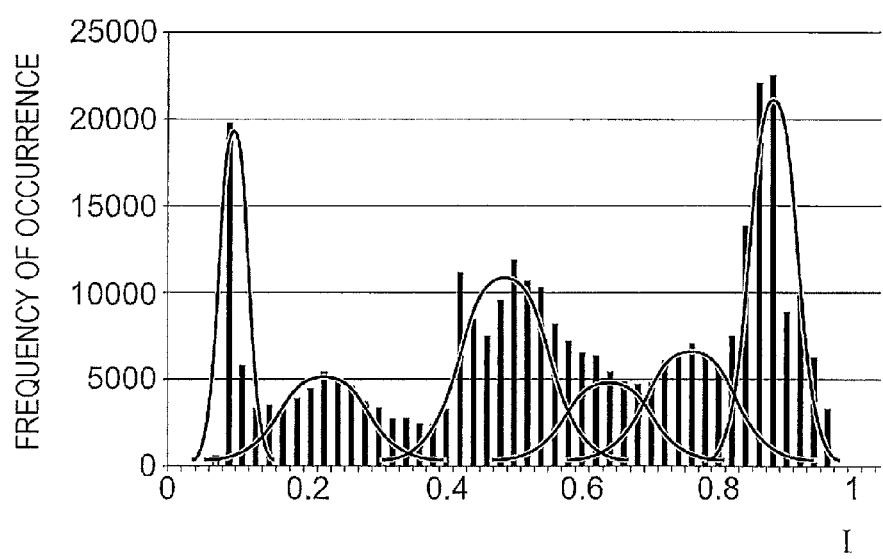
FIG. 7 illustrates a luminance histogram that is approximated using Gaussian mixture model.

FIG. 7 illustrates an example in which the luminance histogram is approximated by the Gaussian mixture model. As illustrated in FIG. 7, the solid line represents the Gaussian mixture model. In this case, the luminance histogram is approximated by a set of six Gaussian distributions.

After the luminance histograms of the process target image and the reference image are approximated by the Gaussian mixture model, a Gaussian distribution including a minimum lightness value is found in the Gaussian mixture model of the reference image. Referring to FIG. 7, the left-most Gaussian distribution is that Gaussian distribution. A Gaussian distribution having a peak luminance equal to or below the peak luminance of that Gaussian distribution including the minimum lightness value is found from the Gaussian mixture model of the process target image. The portion of the found Gaussian distribution is set to be the dark region.

Fourth Exemplary Embodiment

A fourth exemplary embodiment is described below.

The fourth exemplary embodiment is different from the first exemplary embodiment in terms of the function of the feature extractor 12.

In the first exemplary embodiment, the feature extractor 12 extracts the feature quantity from all the pixels forming the reference image. In the fourth exemplary embodiment, the feature extractor 12 extracts the feature quantity from the non-dark region but not from the dark region.

In the first exemplary embodiment, the impression of the entire image matches the reference image after the process target image is image-processed. The luminance in the dark region subsequent to the image processing process is not greatly varied. The dark region looks more natural through the image processing process of the first exemplary embodiment, in contrast to the related image processing process that tends to cause the luminance to greatly vary and to degrade image quality.

In accordance with the second exemplary embodiment, the dark region is set in response to the process target image. The results of the image processing process look more natural.

In accordance with the third exemplary embodiment, the dark region is set in response to the combination of the process target image and the reference image. The results of the image processing process look more natural.

The user is impressed more with the non-dark region than the dark region. In accordance with the fourth exemplary embodiment, when the feature quantity is extracted from the reference image, the feature quantity is extracted from the non-dark region, but not from the dark region. The feature quantity reflecting the user's impression more is extracted from the reference image.

The process of the image processing apparatus 1 in the exemplary embodiments is performed when a software resource and a hardware resource cooperate with each other. A CPU (not illustrated) included in the image processing apparatus 1 executes a program to implement the functions of the image processing apparatus 1.

The process of the image processing apparatus 1 may be considered as a program that causes a computer to perform a component acquisition function that acquires a chromaticity component and a luminance component from each of a process target image and a reference image, the process target image to be image-processed to cause an impression of the process target image to match the reference image, a feature quantity extraction function that extracts a feature quantity from the chromaticity component and the luminance component of each of the process target image and the reference image, a chromaticity component adjustment function that adjusts the process target image to match the chromaticity component of the process target image to the chromaticity component of the reference image using the feature quantity of the chromaticity component, and a luminance component adjustment function that adjusts the process target image to match the luminance component of the process target image to the luminance component of the reference image in a non-dark region other than a dark region using the feature quantity of the luminance component, and reduces an amount of adjustment in the adjustment of the dark region of the process target image to be smaller than an amount of adjustment applied to the non-dark region.

The arithmetic mean is used as a mean value in the exemplary embodiment. Alternatively, the geometric mean may be used. The standard deviation is used as the dispersion in the exemplary embodiment. Alternatively, a variety of other indexes including root mean square, or variance, may be used.

In the exemplary embodiments, the color converter 11 converts the RGB data into the IPT data. The chromaticity data may be alternatively used as long as the chromaticity data is separated into a chromaticity component and a luminance component in the color space. For example, the RGB data may be converted into CIEL*a*b* data, L$\alpha\beta$ data, CAMO2 data, or HSV data instead of the IPT data. The color space equal to the user's amount of perception, such as the CIEL*a*b* color space, or the color conversion through CIECAM 2 or iCAM in view of the user's psychophysical perception may be used in order to acquire a more appropriate feature quantity. The impression subsequent to the image processing process looks more natural.

The comparison of the norms in color space or the technique of sorting image regions, such as graph cut, may be used to segment the image into the dark region and the non-dark region. In this case, the dynamic range of the process target image and the reference image may be adjusted. In this way, even if the luminance histogram of the process target image is greatly different from the luminance histogram of the reference image, the image subsequent to the image processing process tends to look more natural.

From among pixels surrounding a pixel determined to be in the dark region, a predetermined number of surrounding pixels may be processed to be the dark region.

A quadratic function that increases monotonously is used in the adjustment of the dark region. Any function may be used as long as the function increases monotonously. For example, a linear function or a logarithmic function may be used. A curve that accounts for the nonlinearity between the CIEL*a*b* color space as a color difference uniform color space and the IPT color space may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   one or more processors programmed to
   acquire a chromaticity component and a luminance component from each of a process target image and a reference image, the process target image to be image-processed to cause an impression of the process target image to match the reference image;
   extract a feature quantity from the chromaticity component and the luminance component of each of the process target image and the reference image;
   adjust the process target image to match the chromaticity component of the process target image to the chromaticity component of the reference image using the feature quantity of the chromaticity component; and
   adjust the process target image to match the luminance component of the process target image to the luminance component of the reference image in a non-dark region other than a dark region using the feature quantity of the luminance component such that the luminance component of the process target image in the non-dark region of the process target image is adjusted in a linear manner relative to the luminance component of the reference image in a corresponding region of the reference image, and reduce an amount of adjustment in the adjustment of the dark region of the process target image to be smaller than an amount of adjustment applied to the non-dark region such that the luminance component of the process target image in the dark region of the process target image is adjusted in a non-linear manner relative to the luminance component of the reference image in a corresponding region of the reference image, the dark region having a luminance equal to or less than a threshold luminance, and the non-dark region having a luminance above the threshold luminance.

2. The image processing apparatus according to claim 1, wherein the one or more processors are programmed to calculate as the feature quantity a mean value or dispersion of pixel values of pixels forming each of the process target image and the reference image.

3. The image processing apparatus according to claim 2, wherein if the pixels of the process target image are arranged in an ascending order of luminance values based on the luminance components, the one or more processors categorize in the dark region a pixel falling within a predetermined percentage of smaller luminance values.

4. The image processing apparatus according to claim 3, wherein the one or more processors extract the feature quantity from the non-dark region of the reference image while not extracting the feature quantity from the dark region of the reference image.

5. The image processing apparatus according to claim 2, wherein the one or more processors determine the dark region by comparing the luminance value of each pixel of the process target image with the luminance value of each pixel of the reference image.

6. The image processing apparatus according to claim 5, wherein the one or more processors extract the feature quantity from the non-dark region of the reference image while not extracting the feature quantity from the dark region of the reference image.

7. The image processing apparatus according to claim 2, wherein the one or more processors extract the feature quantity from the non-dark region of the reference image while not extracting the feature quantity from the dark region of the reference image.

8. The image processing apparatus according to claim 1, wherein if the pixels of the process target image are arranged in an ascending order of luminance values based on the luminance components, the one or more processors categorize in the dark region a pixel falling within a predetermined percentage of smaller luminance values.

9. The image processing apparatus according to claim 8, wherein the one or more processors extract the feature quantity from the non-dark region of the reference image while not extracting the feature quantity from the dark region of the reference image.

10. The image processing apparatus according to claim 1, wherein the one or more processors determine the dark region by comparing the luminance value of each pixel of the process target image with the luminance value of each pixel of the reference image.

11. The image processing apparatus according to claim 10, wherein the one or more processors extract the feature quantity from the non-dark region of the reference image while not extracting the feature quantity from the dark region of the reference image.

12. The image processing apparatus according to claim 1, wherein the one or more processors extract the feature quantity from the non-dark region of the reference image while not extracting the feature quantity from the dark region of the reference image.

13. An image processing system comprising:

a display apparatus that displays an image; and an image processing apparatus that performs an image processing process on image information of the image displayed on the display apparatus, wherein the image processing apparatus includes one or more processors programmed to acquire a chromaticity component and a luminance component from each of a process target image and a reference image, the process target image to be image-processed to cause an impression of the process target image to match the reference image, extract a feature quantity from the chromaticity component and the luminance component of each of the process target image and the reference image, adjust the process target image to match the chromaticity component of the process target image to the chromaticity component of the reference image using the feature quantity of the chromaticity component, and adjust the process target image to match the luminance component of the process target image to the luminance component of the reference image in a non-dark region other than a dark region using the feature quantity of the luminance component such that the luminance component of the process target image in the non-dark region of the process target image is adjusted in a linear manner relative to the luminance component of the reference image in a corresponding region of the reference image, and reduce an amount of adjustment in the adjustment of the dark region of the process target image to be smaller than an amount of adjustment applied to the non-dark region such that the luminance component of the process target image in the dark region of the process target image is adjusted in a non-linear manner relative to the luminance component of the reference image in a corresponding region of the reference image, the dark region having a luminance equal to or less than a threshold luminance, and the non-dark region having a luminance above the threshold luminance.

14. An image processing method comprising:

acquiring a chromaticity component and a luminance component from each of a process target image and a reference image, the process target image to be image-processed to cause an impression of the process target image to match the reference image;

extracting a feature quantity from the chromaticity component and the luminance component of each of the process target image and the reference image;

adjusting the process target image to match the chromaticity component of the process target image to the chromaticity component of the reference image using the feature quantity of the chromaticity component; and adjusting the process target image to match the luminance component of the process target image to the luminance component of the reference image in a non-dark region other than a dark region using the feature quantity of the luminance component such that the luminance component of the process target image in the non-dark region of the process target image is adjusted in a linear manner relative to the luminance component of the reference image in a corresponding region of the reference image, and reducing an amount of adjustment in the adjustment of the dark region of the process target image to be smaller in the dark region than an amount of adjustment applied to the non-dark region such that the luminance component of the process target image in the dark region of the process target image is adjusted in a non-linear manner relative to the luminance component of the reference image in a corresponding region of the reference image, the dark region having a luminance equal to or less than a threshold luminance, and the non-dark region having a luminance above the threshold luminance.

15. A non-transitory computer readable medium storing a program causing a computer to execute a process for processing an image, the process comprising:

acquiring a chromaticity component and a luminance component from each of a process target image and a reference image, the process target image to be image-processed to cause an impression of the process target image to match the reference image;

extracting a feature quantity from the chromaticity component and the luminance component of each of the process target image and the reference image;

adjusting the process target image to match the chromaticity component of the process target image to the chromaticity component of the reference image using the feature quantity of the chromaticity component; and adjusting the process target image to match the luminance component of the process target image to the luminance component of the reference image in a non-dark region other than a dark region using the feature quantity of the luminance component such that the luminance component of the process target image in the non-dark region of the process target image is adjusted in a linear manner relative to the luminance component of the reference image in a corresponding region of the reference image, and reducing an amount of adjustment in the adjustment of the dark region of the process target image to be smaller than an amount of adjustment applied to the non-dark region such that the luminance component of the process target image in the dark region of the process target image is adjusted in a non-linear manner relative to the luminance component of the reference image in a corresponding region of the reference image, the dark region having a luminance equal to or less than a threshold luminance, and the non-dark region having a luminance above the threshold luminance.

* * * * *